US011669645B2

(12) United States Patent
Vijayvargiya et al.

(10) Patent No.: US 11,669,645 B2
(45) Date of Patent: Jun. 6, 2023

(54) DELEGATED AUTHORIZATION VIA CHASSIS MANAGEMENT CONTROLLER

(71) Applicant: Dell Products L.P., Round Rock, TX (US)

(72) Inventors: Divya Vijayvargiya, Cedar Park, TX (US); Joshua M. Pennell, Kennewick, WA (US); Farhan Mohammed Syed, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/386,182

(22) Filed: Jul. 27, 2021

(65) Prior Publication Data

US 2023/0030576 A1    Feb. 2, 2023

(51) Int. Cl.
  *G06F 21/52* (2013.01)
  *G06F 21/85* (2013.01)
  *G06F 21/31* (2013.01)
  *G06F 21/86* (2013.01)

(52) U.S. Cl.
  CPC ............. *G06F 21/85* (2013.01); *G06F 21/31* (2013.01); *G06F 21/86* (2013.01)

(58) Field of Classification Search
  CPC ............ G06F 21/85; G06F 21/31; G06F 21/86
  See application file for complete search history.

(56) References Cited

U.S. PATENT DOCUMENTS

| | | | |
|---|---|---|---|
| 2010/0077067 A1* | 3/2010 | Strole | G06F 15/17393 709/223 |
| 2016/0182484 A1* | 6/2016 | Shih | H04L 63/18 726/6 |
| 2018/0348836 A1* | 12/2018 | Huang | G06F 1/30 |
| 2020/0322380 A1* | 10/2020 | Sheth | H04L 63/126 |
| 2021/0334399 A1* | 10/2021 | Wright | G06F 21/6218 |

* cited by examiner

*Primary Examiner* — Ashokkumar B Patel
*Assistant Examiner* — William B Jones
(74) *Attorney, Agent, or Firm* — Jackson Walker L.L.P.

(57) ABSTRACT

An information handling system may include a management controller; and a plurality of target information handling systems each including a target management controller that is communicatively coupled to the management controller. The information handling system may be configured to: receive, at a particular target management controller and from a client information handling system, a request for management associated with the particular target management controller; perform, at the management controller, validation of a token associated with the request; and based on the validation, cause the particular target management controller to service the request.

12 Claims, 4 Drawing Sheets

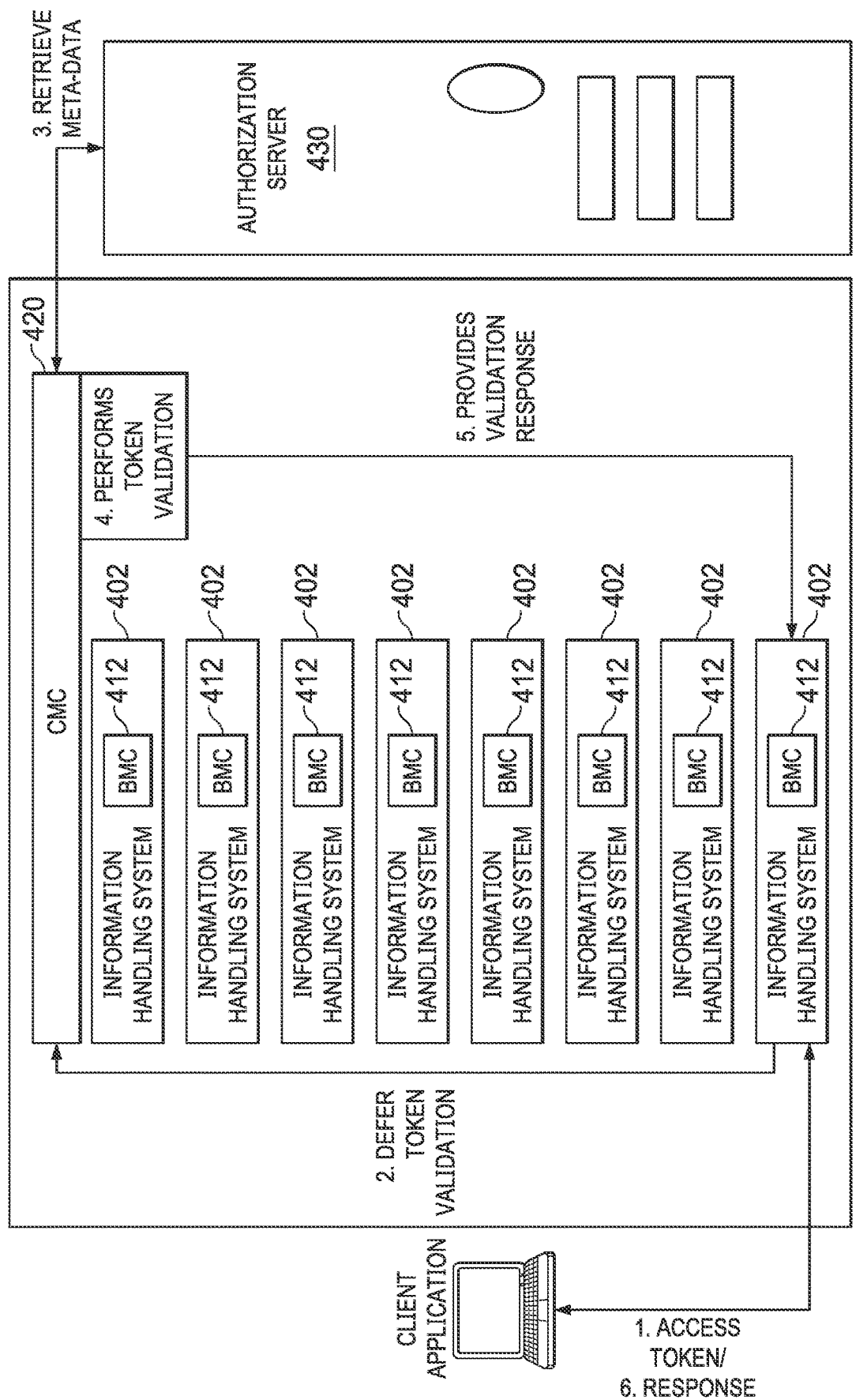

DELEGATED AUTHORIZATION VIA CHASSIS MANAGEMENT CONTROLLER

TECHNICAL FIELD

The present disclosure relates in general to information handling systems, and more particularly to delegated authorization (DA) solutions in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Delegated authorization (also referred to as "delegated auth" or simply "DA") refers generally to systems for accessing services such as application programming interfaces (APIs) in a secure manner. Delegated authorization may allow a user to log into a centralized authorization server, which may issue a token such as a JavaScript Object Notation (JSON) Web Token (JWT). The token may then be used in lieu of having a separate username and password for every service that needs to be accessed. Some delegated authorization systems may leverage technologies such as OAuth 2.0, etc.

The addition of delegated authorization may facilitate a scriptable interface, allowing access to individual management controllers and replacing device-specific usernames and passwords with device-specific tokens. The tokens issued by an authorization server or a signing service are specific to an individual management controller, and they specify the privileges of the token owner with respect to that management controller.

Some delegated authorization systems require a user to perform initial configuration actions on each server individually in order to then use DA to access that server. Only after such a target server has been configured can remote services be exercised using DA via that server's management controller. Additionally, DA may require each of these management controllers to be able to communicate to an authorization server to retrieve metadata and validate the user's access token. This requires the management controllers to be set up for an external network connection, which is not always possible or convenient.

Accordingly, embodiments of this disclosure may provide improvements that may lessen the configuration burdens noted above in the field of delegated authorization.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with delegated authorization in information handling systems may be reduced or eliminated.

In accordance with embodiments of the present disclosure, an information handling system may include a management controller; and a plurality of target information handling systems each including a target management controller that is communicatively coupled to the management controller. The information handling system may be configured to: receive, at a particular target management controller and from a client information handling system, a request for management associated with the particular target management controller; perform, at the management controller, validation of a token associated with the request; and based on the validation, cause the particular target management controller to service the request.

In accordance with these and other embodiments of the present disclosure, a method may include an information handling system that includes a management controller and a plurality of target information handling systems each including a target management controller that is communicatively coupled to the management controller receiving, at a particular target management controller and from a client information handling system, a request for management associated with the particular target management controller; the management controller performing validation of a token associated with the request; and based on the validation, the management controller causing the particular target management controller to service the request.

In accordance with these and other embodiments of the present disclosure, an article of manufacture may include a non-transitory, computer-readable medium having computer-executable code thereon that is executable by a processor of an information handling system that includes a management controller and a plurality of target information handling systems each including a target management controller that is communicatively coupled to the management controller, the code being executable for: receiving, at a particular target management controller and from a client information handling system, a request for management associated with the particular target management controller; performing, by the management controller, validation of a token associated with the request; and based on the validation, causing, by the management controller, the particular target management controller to service the request.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates an example method, in accordance with embodiments of the present disclosure.

DETAILED DESCRIPTION

Figure 1:
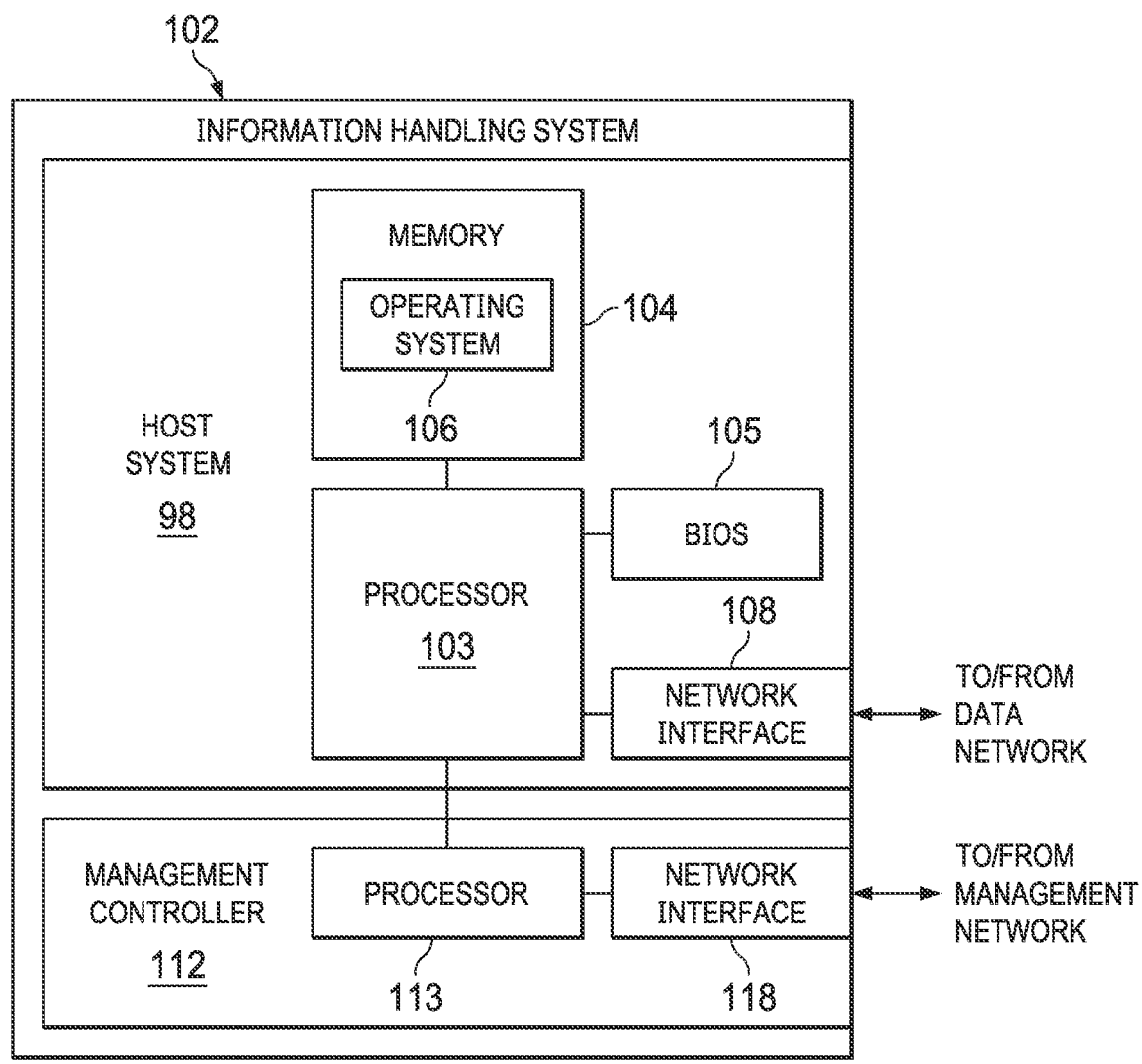
FIG. 1 illustrates a block diagram of an example information handling system, in accordance with embodiments of the present disclosure.

Preferred embodiments and their advantages are best understood by reference to FIGS. 1-4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

In some embodiments, several information handling systems 102 may be incorporated into a single chassis. Each information handling system 102 may have its own management controller 112 in the form of a BMC, while the chassis as a whole may have a management controller 112 in the form of a CMC. As discussed above, in such a situation, some delegated authorization systems would require a user to configure each information handling system 102 individually in order to then use DA to manage that server via its BMC management controller 112. Further, it may also be required for each BMC management controller 112 to be set up for an external network connection. Embodiments of this disclosure may simplify this configuration burden by leveraging the CMC management controller 112. For the sake of clarity and exposition, examples involving BMC management controllers and a CMC management controller will be discussed in detail herein. One of ordinary skill in the art with the benefit of this disclosure will understand its applicability to other systems as well, however.

Figure 2:
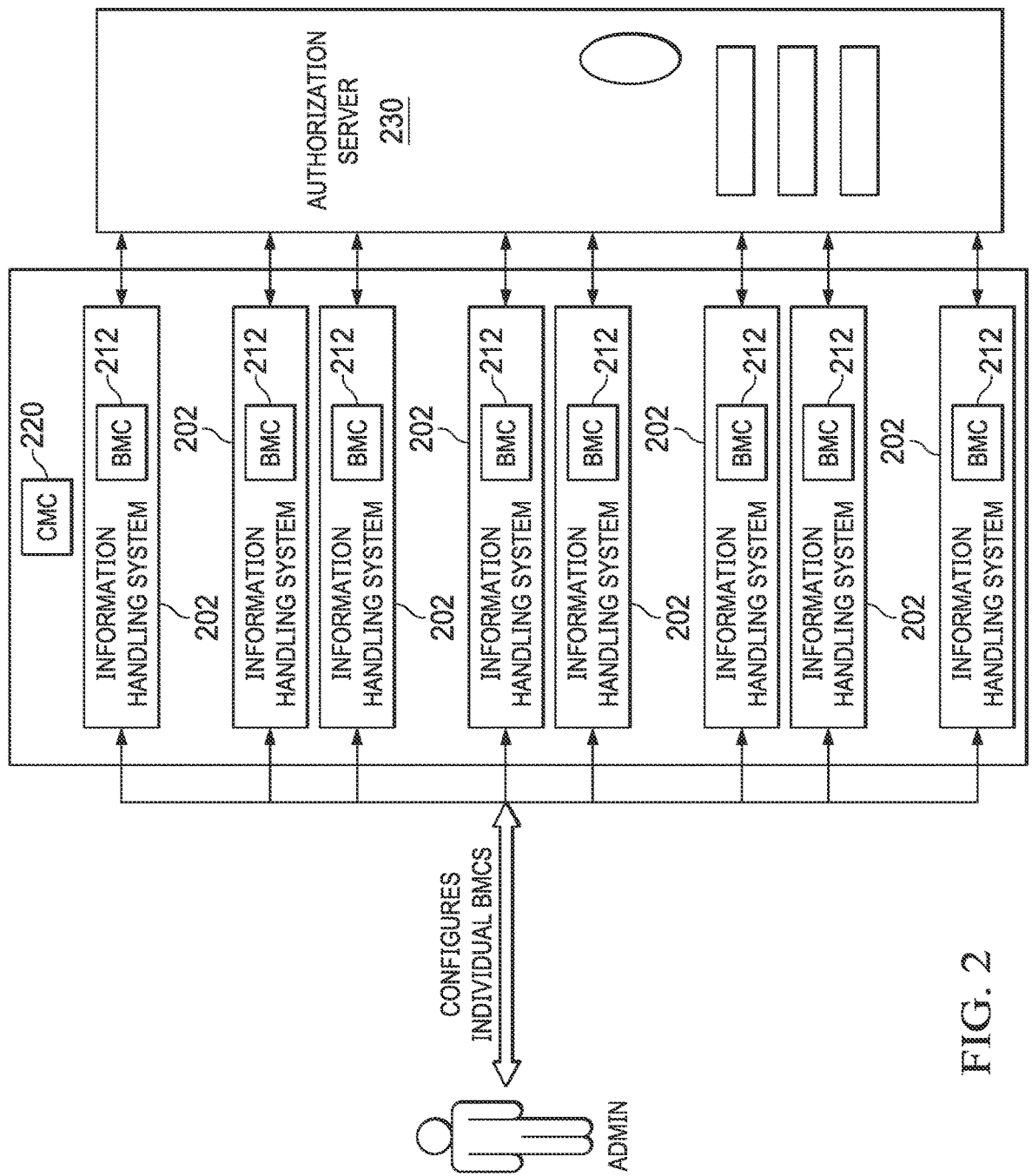
FIG. 2 illustrates a block diagram of an administrator setting up delegated authorization via multiple baseboard management controllers, in accordance with embodiments of the present disclosure.

Turning now to FIG. 2, an example is shown in which an administrator needs to set up a chassis having eight separate information handling systems 202, each with its own BMC 212. The chassis also includes a CMC 220, but in this example, CMC 220 is not used for such configuration.

Accordingly, the administrator has to manually configure each BMC 212 for delegated authorization in order to exercise the access token. Further, each BMC 212 needs to be given external network access in order to communicate with authorization server 230 in order to perform token validation.

Figure 3:
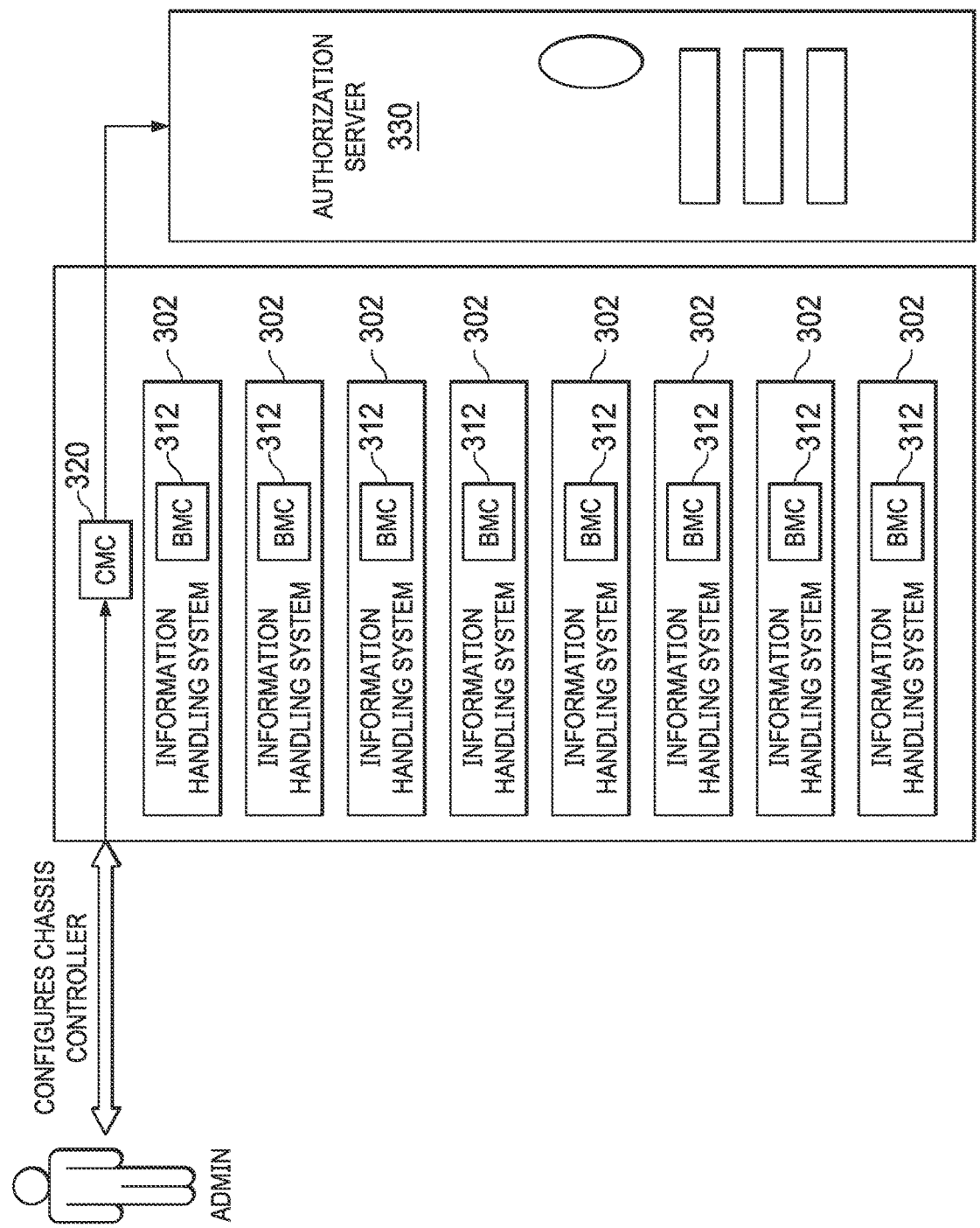
FIG. 3 illustrates a block diagram of an administrator setting up delegated authorization via a single chassis management controller, in accordance with embodiments of the present disclosure.

Turning now to FIG. 3, an embodiment is shown in which the administrator is able to perform the same type of configuration in a more convenient manner. In this embodiment, the administrator configures delegated authorization for the entire chassis stack/cluster via CMC 320. This embodiment leverages the secure internal chassis network between the devices within the chassis and centralizes the delegated authorization solution to the level of CMC 320. Because each device in the chassis has established trust with CMC 320, the individual BMCs 312 that receive requests for remote management services may utilize the trust with CMC 320 to offload the token validation task.

Further, the BMCs 312 need not be connected to an external network. Rather, CMC 320 may be connected to an external network for communication with authorization server 330 in this embodiment.

FIG. 4 provides more detail regarding the usage of a token in the context of a system similar to that of FIG. 3. A client that needs access to one or more of information handling systems 402 may obtain a token from authorization server 430. The client may then make a remote services request for a target BMC 412 associated with the target information handling system 402 by using the access token received from the authorization server.

The target BMC 412 may communicate with CMC 420, deferring the token authentication request to CMC 420. CMC 420 may communicate with authorization server 430 to perform the token validation and extract the user and privileges information from the token. CMC 420 may provide the validation response to the correct BMC 412 along with user and privileges information.

One of ordinary skill in the art with the benefit of this disclosure will understand that the preferred initialization point for the method depicted in FIG. 4 and the order of the steps comprising that method may depend on the implementation chosen. In these and other embodiments, this method may be implemented as hardware, firmware, software, applications, functions, libraries, or other instructions. Further, although FIG. 4 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although the foregoing discussion has focused on an embodiment in which several BMCs in a single chassis are configured via a CMC, other situations are also possible. For example, a cluster of multiple chassis can also be configured in a similar manner. In general, in any situation where a plurality of management controllers can communicate with one another via an established trust mechanism, one management controller may be used to handle delegated authorization in accordance with embodiments of this disclosure.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a management controller; and
a plurality of target information handling systems each including a target management controller that is communicatively coupled to the management controller;
wherein the information handling system is configured to:
receive, at a particular target management controller and from a client information handling system, a request for management associated with the particular target management controller;
perform, at the management controller, validation of a token associated with the request; and
based on the validation, cause the particular target management controller to service the request;
wherein the management controller is a chassis management controller, and wherein the management controller and the target management controllers are communicatively coupled to one another via a secure chassis-internal network.

2. The information handling system of claim 1, wherein the target management controllers are baseboard management controllers.

3. The information handling system of claim 1, wherein the plurality of target information handling systems comprises a cluster of information handling system each including a separate chassis.

4. The information handling system of claim 1, wherein the validation of the token includes transmitting a request to an external authorization server.

5. A method comprising:
an information handling system that includes a management controller and a plurality of target information handling systems each including a target management controller that is communicatively coupled to the management controller receiving, at a particular target management controller and from a client information handling system, a request for management associated with the particular target management controller;
the management controller performing validation of a token associated with the request; and
based on the validation, the management controller causing the particular target management controller to service the request;
wherein the management controller is a chassis management controller, and wherein the management controller and the target management controllers are communicatively coupled to one another via a secure chassis-internal network.

6. The method of claim 5, wherein the target management controllers are baseboard management controllers.

7. The method of claim 5, wherein the plurality of target information handling systems comprises a cluster of information handling system each including a separate chassis.

8. The method of claim 5, wherein the validation of the token includes transmitting a request to an external authorization server.

9. An article of manufacture comprising a non-transitory, computer-readable medium having computer-executable code thereon that is executable by a processor of an information handling system that includes a management controller and a plurality of target information handling systems each including a target management controller that is communicatively coupled to the management controller, the code being executable for:
receiving, at a particular target management controller and from a client information handling system, a request for management associated with the particular target management controller;
performing, by the management controller, validation of a token associated with the request; and based on the validation, causing, by the management controller, the particular target management controller to service the request;

wherein the management controller is a chassis management controller, and wherein the management controller and the target management controllers are communicatively coupled to one another via a secure chassis-internal network.

10. The article of claim 9, wherein the target management controllers are baseboard management controllers.

11. The article of claim 9, wherein the plurality of target information handling systems comprises a cluster of information handling system each including a separate chassis.

12. The article of claim 9, wherein the validation of the token includes transmitting a request to an external authorization server.

* * * * *